Patented June 26, 1928.

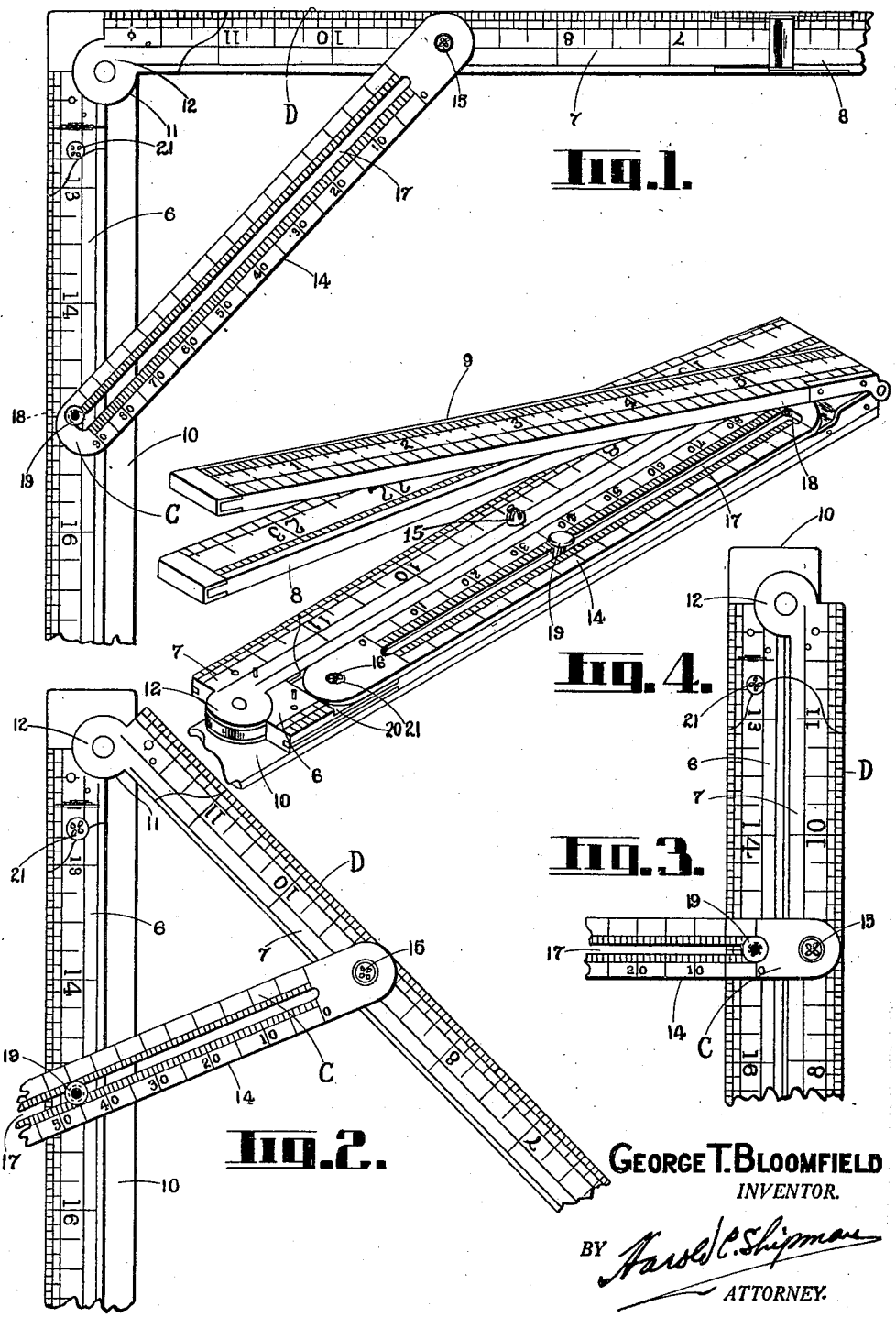
June 26, 1928.
G. T. BLOOMFIELD
1,674,882
COMBINED FOLDING RULE, BEVEL, AND SQUARE
Filed Dec. 21, 1925   2 Sheets-Sheet 1
GEORGE T. BLOOMFIELD
INVENTOR.
ATTORNEY.

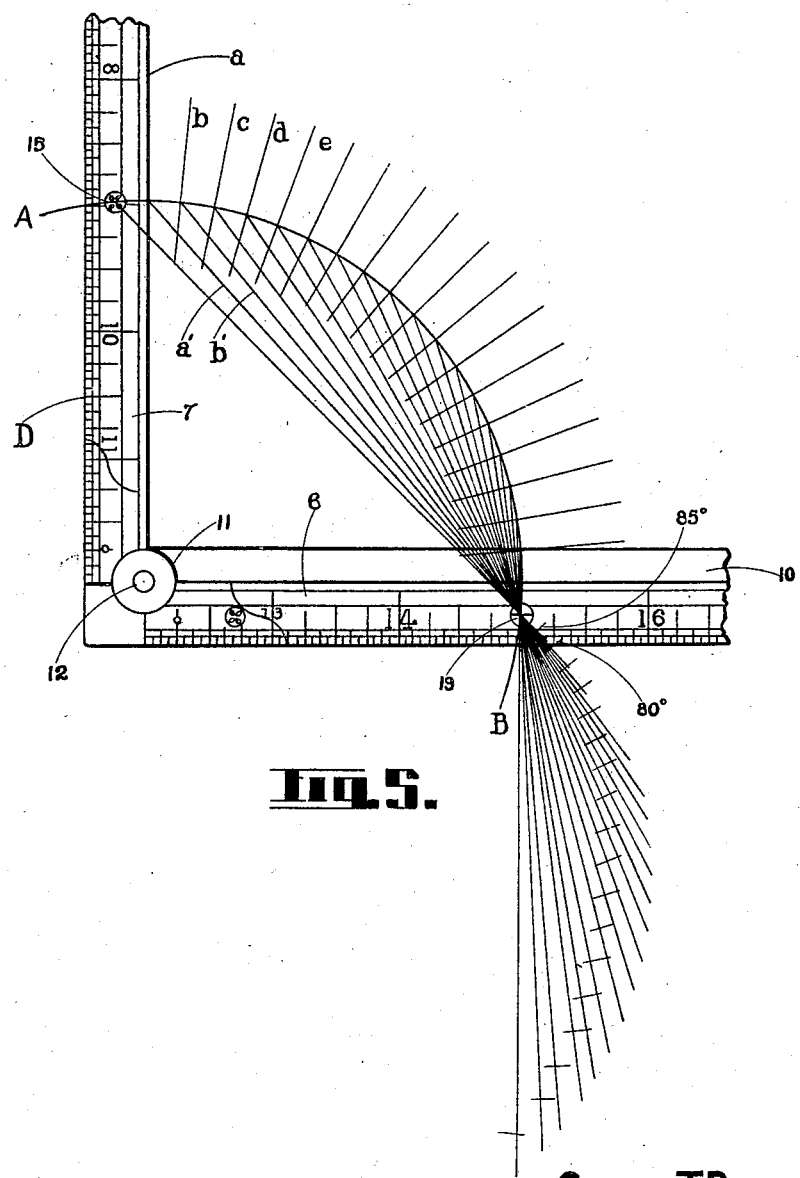

1,674,882

UNITED STATES PATENT OFFICE.

GEORGE THOMAS BLOOMFIELD, OF ORILLIA, ONTARIO, CANADA.

COMBINED FOLDING RULE, BEVEL, AND SQUARE.

Application filed December 21, 1925, Serial No. 76,741, and in Canada September 9, 1925.

My present invention appertains generally to improvements in lineal measuring instruments and comprehends the provision of a combined folding rule, bevel and square, as described in the present specification and illustrated in the accompanying drawings.

The invention consists essentially of the novel features pointed out broadly and specifically in the claims for novelty following a description containing an explanation in detail of an acceptable form of the invention.

This invention has for its object the provision of an instrument of this character which may be used as a rule, square and bevel.

A further object of the invention is to provide such an instrument in as compact form as the well known folding carpenter's rule.

Another object of my invention is to provide a graduated scale on the rule, by which angles of any required degree consistent with the use of the invention, may be developed.

More specifically, my invention comprises, in combination with a folding rule, a straight edge along one of the central adjoining hinged sections, and an angle scale graduated in degrees extending diagonally from said section to the associated section. This scale is detachably connected to the latter section and is adjustably connected with the former, which is provided with a permanent indicating point. Adjustment of the scale to any desired degree will accordingly adjust one section of the rule, so that a line at the required angle may be drawn.

Other objects, advantages and novel features of construction will be apparent ensuing a perusal of the accompanied specification read in conjunction with the annexed drawings, in which:

Fig. 1 is a fragmentary elevation showing the central hinged section of the square disposed at right-angles and the relative position of the angle scale.

Fig. 2 is a similar view, showing the rule adjusted in order that a line at 45° may be inscribed.

Fig. 3 is a corresponding view showing the central sections of the rule folded and in alignment.

Fig. 4 is a fragmentary perspective showing the rule partially folded, and

Fig. 5 is a diagrammatic view illustrating the manner in which the graduations for the angle scale are developed.

Like numerals of reference designate corresponding parts throughout the different views.

The rule with which my invention may be associated, comprises, preferably, four hinged sections 6, 7, 8 and 9, corresponding with the well-known folding rule. A straight edge 10 is mounted upon section 6 of the rule, and extends inwardly slightly past the periphery 11 of the hinge 12, thus permitting this straight edge to bear flat against a plane surface, such as the edge of a piece of lumber.

An angle scale 14 is pivoted to section 7 of the rule. For this purpose a pin 15 provided with a head corresponding with the head on a socalled "dome fastener" may be used, the same seating in a perforation 16 in one end of said angle scale. The angle scale is slotted longitudinally as at 17 and is provided with a laterally extending recess 18 at one end. A pin 19 is mounted upon section 6 of the rule and serves to guide said angle scale when the latter is adjusted, and to retain same when the sections of the rule lie at right-angles by seating in the recess aforesaid, as shown in Fig. 1. The pin 19 is of sufficient length to permit the angle scale 14 to be raised so that it may swing in a plane flush with the upper face of portion 7. The portion 9 will have a countersunk opening in which the head of the pin 19 will register when the rule is turned into compact form.

Section 6 is recessed longitudinally as at 20 to receive the angle scale 14 when the rule is folded, thus enabling the sections thereof to be folded as compactly as rules of this type now commercially available. When folded, the angle scale is held in position by pins 19 and 21, the latter corresponding with pins 15 referred to.

The angle scale is graduated in 90°. The method for marking off the graduations is clearly disclosed in Fig. 5, with the pin of hinge 12 as a centre, an arc A—B is inscribed through the centre of pins 15 and 19, and this arc is graduated into 5° spaces, degrees or fractions thereof, according to the requirements. For illustration purposes, I have, in Fig. 5, divided the arc A—B into 5° divisions, as indicated by the intersecting lines $a$, $b$, $c$, $d$, $e$, and so forth.

Bearing in mind that the pin 15 travels through the arc A—B when section 7 of the rule is swung closed, and that the angle scale is guided by pin 19, the method of spacing off the graduation will be readily obvious. When section 7 of the rule is advanced 5°, the centre of pin 15 will coincide with the intersecting line $a$ at the point of intersection. A line $a'$ is then drawn through this point and through the centre point of pin 19. The distance between the centres of pins 15 and 19 is then measured from the point of intersection aforesaid along said line $a'$, thus marking the graduation 85°. Section 7 of the rule is then further advanced 5°, and line $b$ is drawn to intersect the arc A—B through the centre of pin 15. Line $b'$ is then drawn through this point of intersection and the centre of pin 19. The distances between the centres of said pins is then measured from this point of intersection on line $b$ along line $b'$, thus marking the graduation 80°. This operation is repeated successively until the several graduations are pointed off and the angle scale 14 is then graduated in accordance with the aforesaid graduation, beginning at end C of the scale, as is obviously essential.

In Fig. 1 I have shown sections 6 and 7 of the rule disposed at right-angles. It will be noted that in this position pin 19 seats in recess 18, thus holding the said section in proper spaced relation. By placing the inner edge of the straight edge 10 against the side of a piece of lumber, a line may be drawn across the face of the same by guiding the marking pencil against the edge D of the section 7, and adjoining section 8, if necessary.

When it is desired to draw a line at an angle of say 45°, section 7 is adjusted until the 45° graduation on the angle scale 14 coincides with the centre point of the pin 19, as shown in Fig. 2, where it is held by the hand until the required line is drawn.

From the foregoing it is apparent that I have provided a very practical and useful combination rule, square and bevel, which may be used with facility, folded into compact form for carrying purposes, and which may be manufactured at a very moderate cost.

While the preferred embodiment of the invention has been described it is to be understood that minor changes in the details of constructions, combination and arrangement of co-operating elements may be resorted to within the scope of what is claimed without departing from the spirit of the invention.

What I claim as new is:

1. A folding rule, including sections hingedly connected together at one end; one of said sections being recessed; a longitudinal slotted scale member adapted to fit into said recess; a pivotal connection carried by said recessed section and extending through said slot for retaining said scale member in said recess and said connector being of sufficient length to permit said scale member to be raised to swing in a plane flush with the upper face of the other section.

2. A folding rule, including sections hingedly connected together at one end; one of said sections being recessed; a longitudinal slotted scale member adapted to fit into said recess; a pivotal connection carried by said recessed section and extending through said slot for retaining said scale member in said recess and said connector being of sufficient length to permit said scale member to be raised to swing in a plane flush with the upper face of the other section and a detachable connection between one end of said scale member and an intermediate portion of said other section.

3. A folding rule, including sections hingedly connected together at one end; one of said sections being recessed; a longitudinal slotted scale member adapted to fit into said recess; a pivotal connection carried by said recessed section and extending through said slot for retaining said scale member in said recess and said connector being of sufficient length to permit said scale member to be raised to swing in a plane flush with the upper face of the other section and a detachable connection between one end of said scale member and one end of said recessed portion to retain said scale member parallel with the first mentioned section when the rule is in closed position.

In testimony whereof, I affix my signature.

GEORGE THOMAS BLOOMFIELD.